United States Patent [19]

Kerr

[11] 4,414,807

[45] Nov. 15, 1983

[54] METHOD AND APPARATUS FOR CONTROLLING A GAS TURBINE ENGINE

[75] Inventor: Walter B. Kerr, West Palm Beach, Fla.

[73] Assignee: United Technologies Corporation, Hartford, Conn.

[21] Appl. No.: 214,376

[22] Filed: Dec. 8, 1980

[51] Int. Cl.³ .............................. F02K 1/17; F02C 9/28
[52] U.S. Cl. ........................................ 60/204; 60/236; 60/239
[58] Field of Search ................. 60/243, 235, 236, 238, 60/239, 204, 234; 73/117.4; 137/15.2; 244/53 B; 364/431.02, 578, 803

[56] References Cited

U.S. PATENT DOCUMENTS

| | | | |
|---|---|---|---|
| 2,469,375 | 5/1949 | Flagle | 230/1 |
| 2,688,844 | 9/1954 | McLeod et al. | 60/35.6 |
| 2,870,632 | 1/1959 | Gaubatz | 73/212 |
| 2,876,640 | 3/1959 | Beach, Jr. et al. | 73/182 |
| 2,995,932 | 8/1961 | Hardgrave, Jr. | 73/212 |
| 3,120,123 | 2/1964 | Werner et al. | 73/182 |
| 3,367,565 | 2/1968 | Urban | 230/114 |
| 3,392,585 | 7/1968 | Bentz et al. | 73/388 |
| 4,003,249 | 1/1977 | Laskody | 73/117.4 |
| 4,130,872 | 12/1978 | Harloff | 73/117.4 |
| 4,159,625 | 7/1979 | Kerr | 60/204 |
| 4,228,650 | 10/1980 | Camp | 60/39.09 R |
| 4,294,069 | 10/1981 | Camp | 364/431.02 |

FOREIGN PATENT DOCUMENTS 926556  9/1968  United Kingdom .

Primary Examiner—L. J. Casaregola
Attorney, Agent, or Firm—Stephen E. Revis

[57] ABSTRACT

A gas turbine engine control for an engine which experiences airflow distortion at the engine inlet face plane uses a static pressure measurement upstream of the face plane along with a corrected rotor speed to generate a signal indicative of the average total pressure at the engine face plane. This signal is combined with a total pressure signal from elsewhere in the engine to generate a pressure ratio signal which is compared to the scheduled pressure ratio for the current operating conditions. Control logic then adjusts either the fuel flow rate to the burners or the area of the exhaust nozzle in response to the difference between these pressure ratios.

5 Claims, 1 Drawing Figure

METHOD AND APPARATUS FOR CONTROLLING A GAS TURBINE ENGINE

TECHNICAL FIELD

This invention relates to controlling a gas turbine engine.

BACKGROUND ART

The fuel flow rate to the burners of a gas turbine engine or the area of a variable exhaust nozzle is typically modulated to control, either directly or indirectly, the ratio of the average total pressure at a station in the engine to the average total pressure in the plane of the leading edge of the first cascade of airfoils in the engine, which is referred to herein as the inlet face plane. This first cascade may be stationary inlet guide vanes or rotating fan blades. The total pressures are measured directly by suitable probes which feed the pressure signals to means which calculate the pressure ratio and adjust the fuel flow to the burners in a scheduled manner. Correction factos and temperature and pressure limits and the like may also be taken into account to eliminate the effect of, for example, engine aging. One such control for a gas turbine engine is described in commonly owned U.S. Pat. No. 4,159,625 by W. B. Kerr, the inventor of the present application.

With some engine installations there is a total pressure gradient in the inlet face plane. This is generally caused by the air induction system to the engine which, when subjected to high "g" maneuver conditions, distorts the airflow distribution and pressure at the engine face. In engines where there is this distortion of the airflow, an accurate measurement of the average total pressure in the inlet face plane requires a large number of total pressure probes (perhaps three or four dozen) appropriately distributed in the inlet face plane. In those situations, controlling the engine using a direct measurement of the average total pressure in the inlet face plane involves a considerable amount of expensive hardware and undesirable instrumentation complexity.

Commonly owned U.S. Pat. No. 4,228,650 is of interest as regards the present invention for its teaching that if a device for directly measuring burner pressure (or other parameter) fails, a burner pressure signal can be synthesized or simulated. This is accomplished by a function generator which is fed other measured parameters and produces an output signal indicative of the ratio of the burner pressure to another engine parameter. The ratio is then multiplied by the other engine parameter, yielding a signal indicative of the synthesized burner pressure signal which is then passed to a control to substitute for the failed sensed parameter.

DISCLOSURE OF THE INVENTION

An object of the present invention is an improved method and apparatus for controlling a gas turbine engine.

Another object of the present invention is a method and apparatus for controlling a gas turbine engine which does not require direct measurement of the inlet face plane average total pressure.

Accordingly, in a gas turbine engine having a total pressure gradient across the inlet face plane, the engine control means is responsive to and schedules the fuel flow or the exhaust nozzle area in response to compressor rotor speed, air temperature at the inlet face plane, and the static pressure in the air inlet duct upstream of the inlet face plane in a straight, constant cross sectional cylindrical portion of the air inlet duct where there is no static pressure gradient.

The main advantage of the present invention is the elimination of the large number of total pressure probes required by the prior art to obtain an accurate average total pressure reading for the engine inlet face plane. More specifically, the angle of attack of a jet aircraft, other than straight and level, often creates both a static and total pressure gradient across the engine air inlet duct entrance. Similarly, a noncylindrical entrance and an entrance which is not aligned with the engine axis can also create or add to airflow distortions. When the duct straightens out to a constant cylindrical cross section, the static pressure gradient disappears; however, the total pressure gradient continues to be present right through to the engine inlet face plane. The first rotating airfoil cascade works to eliminate the circumferential and radial airflow gradients. This creates a static pressure gradient or distortion at the inlet face plane and upstream thereof for a distance which has been experimentally determined to be no more than about one-half the duct diameter. Further upstream, if the duct is still straight and of constant cylindrical cross section, the static pressure gradient is zero. Notwithstanding any static pressure gradients within this straight duct portion upstream of the inlet face plane, the average static pressure in any plane perpendicular to the engine axis within this straight duct, including the inlet face plane, is the same. Thus, the average static pressure at the inlet face plane can be accurately measured with a single static pressure probe upstream of the inlet face plane where the static pressure across the duct is constant and unaffected by the engine compressor section.

A schedule, for all operating conditions, of the value of the ratio of the average total pressure to the average static pressure at the inlet face plane can be developed solely from the temperature of the air at the inlet face plane and the fan or compressor rotor speed. By multiplying this ratio by the measured static pressure upstream of the inlet face plane, a signal can be generated which has been found to be representative of the average total pressure in the inlet face plane. This has been confirmed by comparisons with thirty-six (36) direct average total pressure measurements during F-15 aircraft flight tests. This signal is combined with a total pressure signal from another station in the engine to provide a signal indicative of the pressure ratio across that station and the inlet face plane. This pressure ratio signal may then be compared to a reference or scheduled pressure ratio signal and the difference or error signal used by control logic means to control either the fuel flow to the burner or the area of the exhaust nozzle.

The foregoing and other objects, features and advantages of the present invention will become more apparent in the light of the following detailed description of the preferred embodiments thereof as shown in the accompanying drawing.

BRIEF DESCRIPTION OF THE DRAWING

The sole FIGURE is a schematic drawing showing a turbofan engine and control illustrating the method and apparatus of the present invention.

BEST MODE FOR CARRYING OUT THE INVENTION

Figure 1:
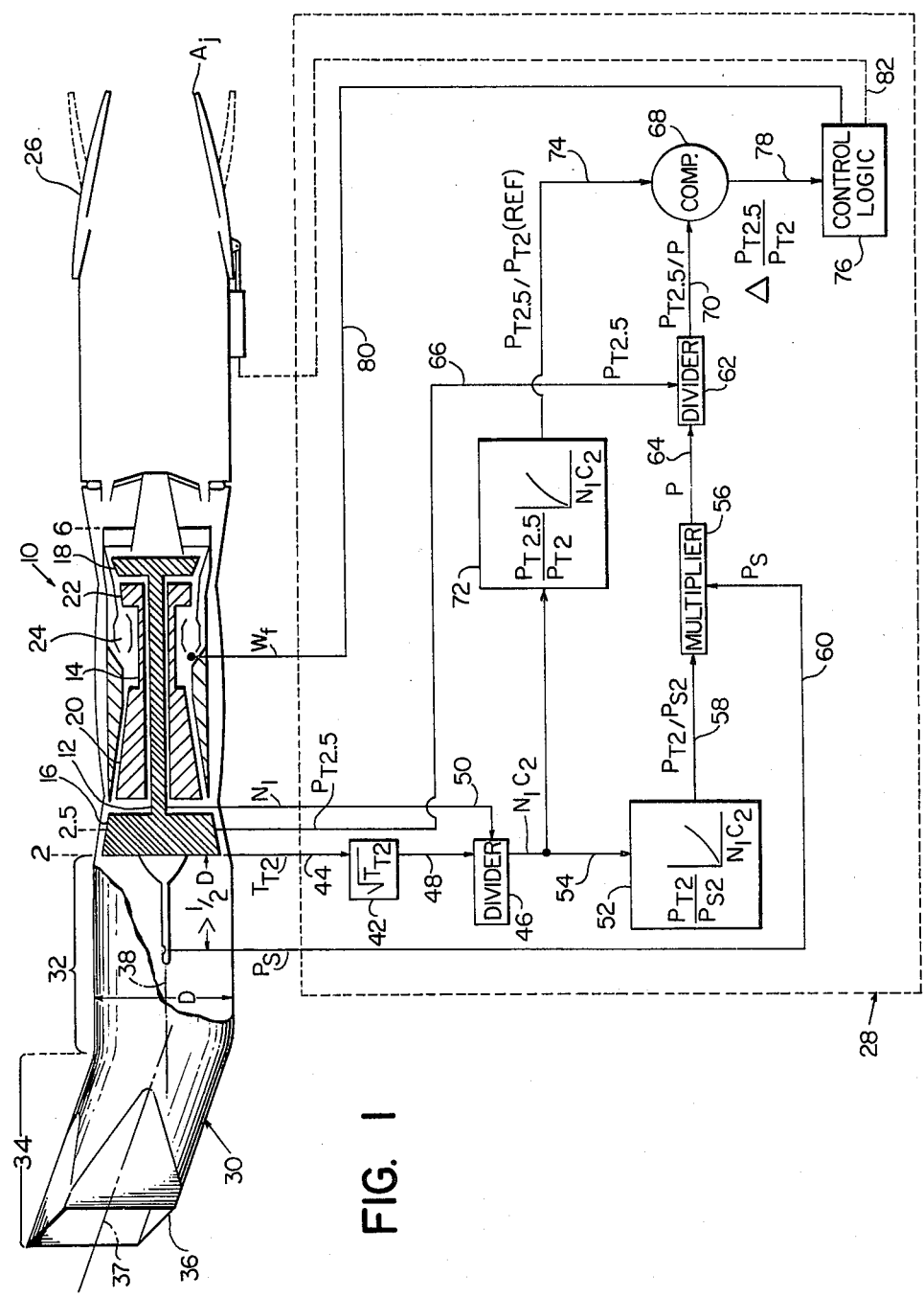

Referring to FIG. 1, there is shown in schematic for a typical twin spool augmented turbofan engine 10 having a low spool 12 and a high spool 14. The front compressor or rotor portion 16 of the low spool 12 is denoted as the fan and is driven by the fan turbine 18 to which it is connected. The rear compressor or rotor portion 20 of the high spool is driven by the high turbine 22. The burner 24, to which fuel is supplied, provides energy to drive the turbines 18 and 22. The gases which pass through the turbines are expanded through a variable area exhaust nozzle 26 (having an area designated $A_j$) to produce thrust. The burner 24 is supplied fuel in a controlled amount by a control system 28 which may be a combination of electronic and, for example, hydromechanical elements. Computers are often incorporated into the controls.

In this embodiment the engine includes an air inlet duct 30 which extends upstream of the engine for a considerable distance. The duct 30 consists of a rear portion 32 having a substantially straight, constant, cylindrical cross section and a front portion 34 having an inlet 36 of rectangular cross section which transitions to a cylindrical cross section where the front portion 34 meets the rear portion 32. The axis or center line 37 of the front portion 34 is at an angle relative to the axis 38 of the rear portion 32 which is coextensive with the engine axis. For nonstraight-and-level angles of attack, air flow entering the duct front portion 34 is distorted and turned as it enters the duct rear portion 32. A total pressure gradient and a static pressure gradient perpendicular to the engine axis are thereby created within the duct portion 34. At the plane of the interface between the duct portion 34 and the duct portion 32, or a short distance downstream therefrom, the air has straightened out and the said static pressure gradient becomes zero. However, a total pressure gradient remains throughout the length of the straight duct portion 32 including the engine inlet face plane, which is the plane of the leading edge of the fan blades in the fan stage. A noseboom probe 38 extends from the engine nose cone 40 and measures the static pressure $P_S$ at a point at least one-half duct diameter (D) distance axially upstream of the inlet face plane, but downstream of any static pressure gradient in the duct portion 34.

It is standard practice to designate locations along the length of the engine by numbered stations. In FIG. 1 the plane of the leading edge of the fan blades is station 2, which is also referred to herein as the engine inlet face plane. Station 2.5 is at the fan outlet or at the plane of the trailing edge of the fan blades. Station 6 is at the core engine discharge just downstream of the last stage of vanes. Numbered subscripts on pressures and temperatures used herein refer to these stations. A pressure ratio "across a station" means the ratio of the average total (subscript T) pressure at the indicated station to the average total pressure at station 2. Thus, the pressure ratio across station 2.5 (the fan station) is $P_{T2.5}/P_{T2}$, and is called the fan pressure ratio. The pressure ratio across station 6 is $P_{T6}/P_{T2}$, and is called the engine pressure ratio since it is across the entire engine.

Engine control systems perform many functions within the engine; however, this invention is only concerned with selected portions of the engine control system, and it is these portions of the controls and their inputs and outputs which are described herein. The engine control system monitors a number of different variables and adjusts fuel flow or other variable engine components so as to achieve a more optimum engine performance for the engine flight envelope and to prevent or minimize the possibility of the engine stalling.

In this embodiment the engine control system 28 receives input signals indicative of selected engine parameters, namely, a signal indicative of the temperature of the air at the inlet face plane (i.e., engine inlet total temperature $T_{T2}$) and a signal indicative of the fan rotor speed $N_1$. The temperature signal is fed to a square root computer 42 via a line 44 and the output thereof is applied to a divider 46 via a line 48 along with the fan rotor speed $N_1$ via a line 50. The output from the divider 48 is $N_1 \div \sqrt{T_{T2}}$ and is the corrected rotor speed $N_1C_2$. The corrected rotor speed is fed to a function generator 52 via a line 54. In the function generator 52 a scheduled fan total to static pressure ratio signal $P_{T2}/P_{S2}$ is produced and fed to a multiplier 56 via a line 58 along with a signal indicative of the measured static pressure $P_S$ via the line 60. The multiplier 56 multiplies these two input signals to produce a signal P which is substantially equivalent to the average total pressure in the inlet face plane. This pressure signal P is sent to a divider 62 via a line 64. A pressure probe positioned at station 2.5 measures the average total pressure $P_{T2.5}$ at the fan outlet, and this signal is also sent to the divider 62 via a line 66. The divider calculates the fan pressure ratio $P_{T2.5}/P$ and sends a signal indicative thereof to the comparator 68 via a line 70.

The corrected rotor speed $N_1C_2$ is also fed from the divider 46 to a function generator 72 in which a scheduled or reference fan pressure ratio $P_{T2.5}/P_{T2}$ is produced and is fed to the comparator 68 via a line 74. The comparator 68 produces an error signal (denoted) as $\Delta P_{T2.5}/P_{T2}$) indicative of the difference between the scheduled fan pressure ratio from the function generator 72 and the fan pressure ratio on line 70. This error signal is then fed to the control logic means 76 via a line 78. The control logic is designed to regulate either the fuel flow $W_f$ via a line 80 or the exhaust nozzle area $A_j$ via the broken line 82. A second control system, not shown, would be used to regulate whichever of these is not regulated by the control system 28.

Although in this embodiment the pressure $P_{T2.5}$ at the fan outlet is fed to the divider 62, the pressure $P_{T6}$ at the core engine discharge (station 6) may also be used if it is desired to control the fuel flow rate or the exhaust nozzle area based upon engine pressure ratio instead of fan pressure ratio, in which case the function generator 72 would be designed to produce a signal indicative of the scheduled engine pressure ratio.

Although the invention has been shown and described with respect to a preferred embodiment thereof, it should be understood by those skilled in the art that other various changes and omissions in the form and detail thereof may be made therein without departing from the spirit and the scope of the invention.

I claim:

1. Control means for controlling a gas turbine engine during flight, said engine having a variable area exhaust nozzle and including a compressor and a turbine for driving said compressor and burner means disposed downstream of said compressor and upstream of said turbine for generating hot gases for driving said turbine, said engine having an inlet face plane, engine air inlet duct means disposed upstream of said engine for directing air into said engine, said duct means including a straight portion of substantially constant cylindrical cross section extending axially upstream from said inlet face plane for a distance equal to at least one half of said straight portion diameter, wherein said control means includes means responsive to the static pressure at a point in said inlet duct straight portion at least one-half duct diameter axially upstream of the inlet face plane for generating a first signal indicative of said static pressure, means responsive to the rotational speed of said compressor and to the temperature of the air at said inlet face plane for calculating a corrected compressor speed, means responsive to said corrected compressor speed for generating a second signal indicative of the average total to static pressure ratio at the inlet face plane, means responsive to said first signal and said second signal for generating a third signal indicative of the average total pressure in said inlet face plane, and means responsive to said third signal and to a total pressure at an engine station downstream of said inlet face plane for generating a fourth signal indicative of a pressure ratio across said station, means responsive to said corrected compressor speed for generating a fifth signal indicative of a scheduled pressure ratio across said station, and, means responsive to the difference between said fourth and fifth signals for controlling either the flow of fuel to said burner means or the area of said exhaust nozzle.

2. The control means according to claim 1 wherein said engine is a twin spool engine, and said twin spool includes a fan and a low turbine for driving said fan, and wherein said engine station is the fan or the entire engine.

3. The control means according to claim 2 wherein said engine station is the entire engine.

4. A method for controlling a gas turbine engine during flight wherein said engine includes a compressor, a turbine for driving said compressor, burner means disposed between said compressor and turbine for generating hot gases to drive said turbine, a variable area exhaust nozzle downstream of said turbine, air inlet duct means upstream of said compressor constructed and arranged such that a total pressure gradient is created within said duct means during certain flight attitudes, said duct means including a straight portion of substantially constant cylindrical cross section extending from the engine inlet face plane axially upstream for a distance equal to at least one half of said straight portion duct diameter, comprising the steps of:

measuring the static pressure at a point within said inlet duct means straight portion at least one-half duct diameter axially upstream of the engine inlet face plane and generating a first signal indicative thereof;

measuring the rotational speed of said compressor and generating a second signal indicative thereof;

measuring the total air temperature in said inlet face plane and generating a third signal indicative thereof;

measuring a total pressure at an engine station downstream of said inlet face plane and generating a fourth signal indicative thereof;

calculating a corrected compressor speed;

calculating a scheduled pressure ratio for said corrected compressor speed;

calculating a pressure ratio across said engine station based upon said measured static pressure, corrected compressor speed, and inlet face plane temperature; and controlling the area of said exhaust nozzle or the fuel flow rate to the burner means as a function of the difference between said calculated pressure ratio and said scheduled pressure ratio.

5. The method according to claim 4 wherein said engine is a twin spool engine including a fan and a low turbine for driving said fan, and said engine station is either said fan or the entire engine.

* * * * *